Oct. 28, 1969  J. SERRACANT SELVAS  3,474,645
MACHINES FOR THE CONTINUOUS TREATMENT OF FILIFORM GROUPED
MATERIALS BY MEANS OF FLUIDS UNDER PRESSURE AND OR
AT HIGHER THAN BOILING POINT TEMPERATURES
Filed Aug. 28, 1967  3 Sheets-Sheet 1
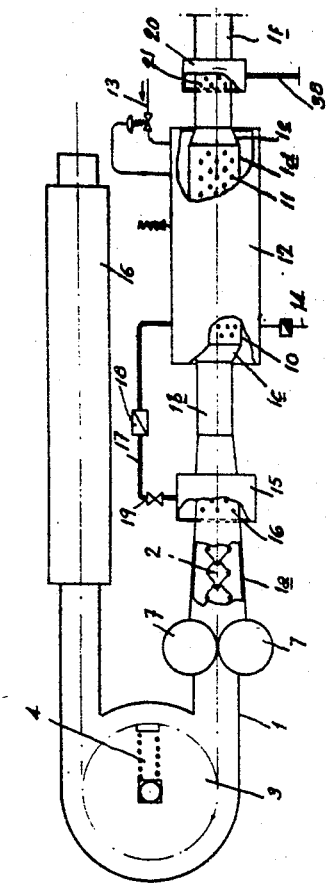
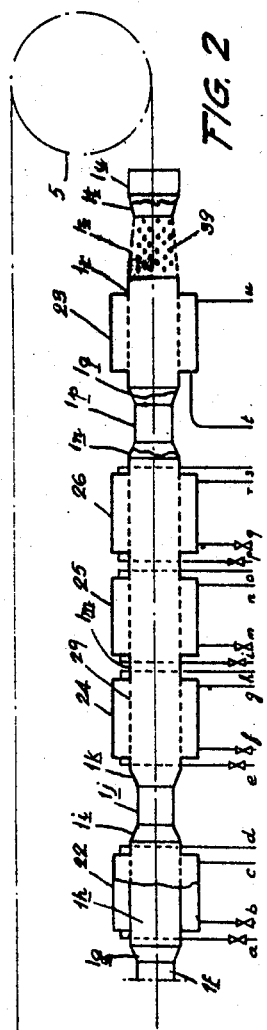
Inventor
José Serracant Selvas
By
Wenderoth, Lind & Ponack
Attorneys

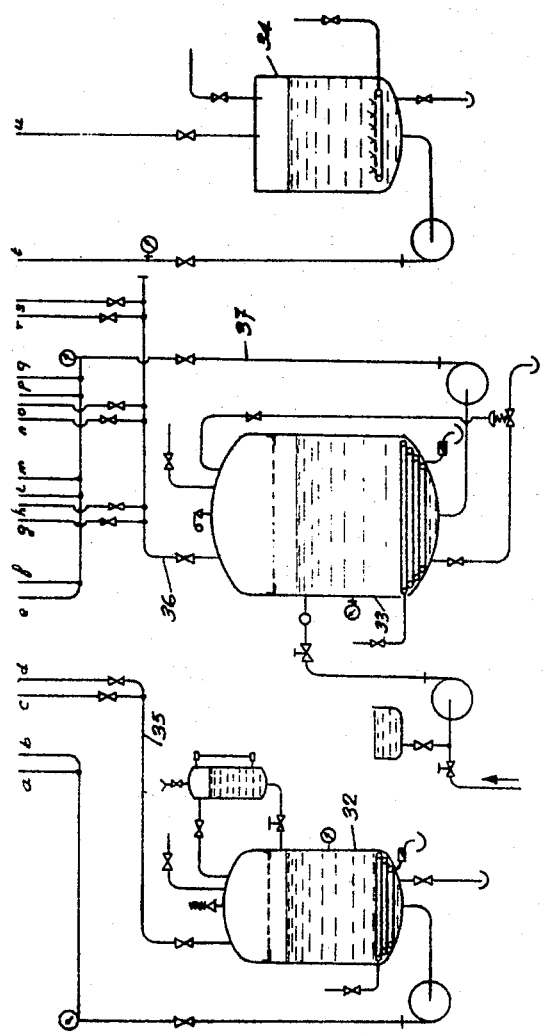

| FIG. 1 | FIG. 2 |
|--------|--------|
| FIG. 6 | FIG. 3 |

Inventor
José Serracant Selvas
By
Wenderoth, Lind & Ponack
Attorneys

United States Patent Office 3,474,645
Patented Oct. 28, 1969

3,474,645
MACHINES FOR THE CONTINUOUS TREATMENT OF FILIFORM GROUPED MATERIALS BY MEANS OF FLUIDS UNDER PRESSURE AND/ OR AT HIGHER THAN BOILING POINT TEMPERATURES
José Serracant Selvas, Sabadell, Barcelona, Spain, assignor to Maria Teresa Clermont Vinas, Sabadell, Barcelona, Spain
Filed Aug. 28, 1967, Ser. No. 663,865
Claims priority, application Spain, Aug. 27, 1966, 331,072
Int. Cl. D06f 37/00
U.S. Cl. 68—5　　　　　　　　　　　　　　　12 Claims

ABSTRACT OF THE DISCLOSURE

A machine for the continuous treatment of filiform grouped materials by means of fluids under pressure at a boiling point temperature or higher. An essentially rectangular tubular encounter has a perforated zone surrounded by a chamber containing water vapor under pressure. An inlet for feeding material hermetically to an endless conveyor that drags the material throughout the length of the tubular enclosure. The tubular enclosure has a progressive variation of the sectional area that increases and decreases at distant zones throughout its length for the continuous expansion and compression of the material in movement thereby giving rise to spongy states of the material to facilitate the penetration therein of the treatment fluids. There is a tightness of the material at other zones producing hermetic stoppers.

---

Figure 4:
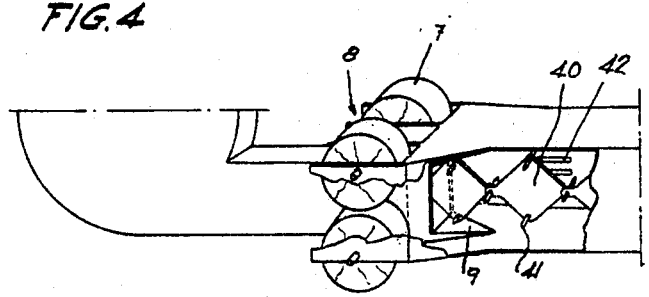

This invention has for its object certain improvements in machines for the continuous treatment of filiform grouped materials such as slivers or rovings, by the application thereto of steaming, development and finishing operations by means of water vapor and other fluids in a liquid or gaseous state.

Continuous steaming machines are already known comprising a tubular enclosure with a perforated zone for the entrance of the vapour and through which enclosure an endless chain or other endless transporting element runs provided with projections for dragging the materials; as also an inlet device comprising two gyratory rollers with coinciding annular central slots for the passage of the transporting element, said slots housing an element of general conical form provided with a central aperture for the passage of said conveyor element; provided also with means to keep the linear velocity of the conveyor belt lower than the superficial velocity of the rollers themselves; and finally with a device for the hermetic outlet of the materials when steamed.

This invention has for its object the provision of a machine of the foregoing type, but with better circulation of the textile materials throughout the tubular enclosure, while obtaining also perfect tightness of the treatment vapour or fluid, which is attained according to this invention by progressively varying the section of the tubular enclosure around the conveyor element in order to secure compression or expansion of the moving material facilitated by its elastic nature, according to the zones where either a plugging action of the contained material is required, or a spongeous formation of same to permit the permeation of the treatment fluids respectively.

Another characteristic of this invention consists of providing adequate means in the machine itself, for carrying out subsequent operations to the material after the steaming treatment, such as those of development and finishing during the same continuous process.

For this purpose and according to this invention, the tubular enclosure or conduit of the machine is provided with a section of sufficient size immediately after the feeding device, to allow the material to enter therein with the minimum pressure necessary that permits its being dragged by the conveyor element, said section of the tubular enclosure being progressively reduced in size thereafter, thus subjecting the conveyed material to a gradually increasing compression which finally, at the end of said section diminishing zone, becomes sufficient to provide the necessary degree of blockage of the inlet zone of the material.

Near the middle of the inlet zone, a series of perforations surrounded by an outer casing forms a presteaming chamber connected by tubing to the main steaming chamber, in order to prefix the material in movement as much in its structural components as its contained impregnating products.

The invention comprises also the fact that the perforated zone of uniform section within the steaming chamber, is of sufficient area to allow the material to attain a spongeous state by reason of its inherent elasticity, without affecting its portability by the conveyor element, thus facilitating the penetration of the steam into its mass; while the enlargement of the area of this steaming chamber at the entrance thereto, is reduced at the end thereof to the previous tubular enclosure sectional area in order to increase the density of the contained material, thus producing another blockage similar to that produced at the inlet zone as previously mentioned.

The steaming process now being finished, other development and finishing operations forming part of this continuous treatment follow, whereby the tubular main enclosure or conduit of the machine in continuation from the final reduction zone of the steaming chamber, is prolonged to incorporate one or more independent or conjoined elements whose top and bottom walls are essentially perforated and are surrounded by casings provided with inlet and outlet tubes for the treatment of the moving material contained therein by means of dynamic fluids, for which purpose these tubes form part of appropriate systems for the production of forced circulations of the treatment fluids at atmospheric pressure or in closed circuits under pressure, comprising also means for reversing the direction of flow of said fluids which may actuate conjointly, or separately or counter-directionally.

The sectional area of the tubular enclosure is of such dimensions that the density of the moving material under treatment is lowered sufficiently to facilitate the permeation of the treatment fluids, as also reductions at adequate zones of such sectional areas, so as to increase the density of the conveyed material between the different tubular elements. These are provided to prevent the mixture of the distinct dynamic treatment fluids circulating through the aforementioned independent elements in continuation from the steaming chamber.

Finally, a zone of diminishing sectional area is provided just before the unloading zone of the machine, the walls of said reduction zone being provided with perforations, while the convergence of the walls provokes an increase in density of the material in movement and a consequent continuous squeezing and draining thereof.

This invention is characterized also by the preferential constructional form of the conveyor element being composed of a succession of pairs of outer plates arranged vertically, separated the one from the other and joined together by means of connecting pins at right-angles to the direction of their movement, forming links that are articulated in sequence forming a chain, said connecting pins serving to draw or drag the material through the machine; another essential characteristic being the uniform dimensions of said links and their maximum size in relation to the interior dimensions of the principal tubular enclosure or conduit of the machine, so as to prevent the contained material from passing to the opposite side of the conveyor element.

A more detailed description will now be given of the improvements in machines for the continuous treatment of filiform grouped materials by means of fluids under pressure or at higher than boiling point temperatures, which is an object of this invention, by the use of the adjoining drawings showing schematically one form of realization thereof as a practical example only.

The FIGURES 1, 2 and 3 coupled together as shown in FIGURE 6, reveal a conjoint assembly in schematic form of this invention.

FIGURE 4 shows a partial view of the machine showing in detail the inlet device of same.

Figure 5:
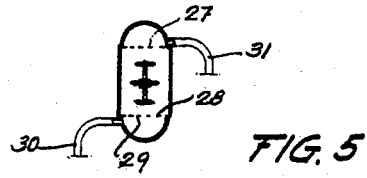

FIGURE 5 finally shows a detailed cross section of one of the tubular elements where the material undergoes a development of finishing treatment.

Referring to these drawings, the machine herein described comprises essentially a tubular enclosure or conduit 1, through whose entire length runs an endless chain conveyor element 2 for carrying the material under treatment, driven by the pulley 3 provided with a device for tightening the conveyor chain 4, a return pulley 5 and a heating chamber 6 for the conveyor element, thus completing the system.

The material is fed into the tubular enclosure 1 by means of two rollers 7 provided with annular central slots 8 housing a cuneiform element 9 provided with an opening for the passage of the conveyor element 2, so that the material enters the tubular enclosure 1 divided into two sections, one on either side of the conveyor chain.

One part 10 of the tubular enclosure 1, is provided with perforations 11 and surrounded by a casing 12 containing steam, which casing is provided with the corresponding steam inlet and outlet conduits 13 and 14. As will be seen, the sectional area of the tubular enclosure 1 is varied throughout its entire length.

A small tubular element 15 is situated between the inlet device and the steaming chamber 12 in the tubular conduit 1, the tubular element 15 surrounding a perforated portion 16 of said tubular conduit, said element 15 being connected by a tube 17 through a pressure reducing device 18 and a valve 19 to the steaming chamber 12 with the object of presteaming the textile materials to fix the structural components of said materials and the products impregnating same. Another small element 20 is situated in continuation of the steaming chamber 12 to effect an opposite process to that of the element 15, in that the vapour contained in the fibres is allowed to escape through the perforations 21 in the corresponding zone of the tubular enclosure 1 into the element 20 and out through the tube 38, thus preventing damage to the material under treatment.

In continuation of the tubular enclosure 1, independent tubular elements as 22 and 23, or coupled elements as in 24, 25 and 26 are situated, comprising casings for covering the top and bottom sides 27 and 28 and their perforations 29, allowing diverse development and finishing treatments of the moving material by means of dynamic fluids, to be carried out. For this purpose, each of the chambers formed by the aforesaid tubular elements is provided with the corresponding inlet and outlet conduits 30 and 31 for the dynamic fluids under pressure and/or at higher than boiling point temperatures, obliging said fluids to pass through the material vertically to the perforated sides 27 and 28 of said tubular elements.

The treatment fluids are fed from feed tanks 32, 33 and 34 through adequate systems 35, 36 and 37 comprising means for reversing the flow direction of the fluids, and for producing forced circulation of same by means of the inlets and outlets 30 and 31 to and from the aforementioned tubular elements.

As already stated, the sectional area of the main tubular enclosure 1 is not constant throughout its length, seeing that from the inlet rollers 7, the first zone 1a is of sufficient area to permit just enough conglomeration of the material to allow it to be carried by the conveyor chain, said sectional area gradually diminishing to that of the portion 1b of constant or uniform section. From this it will be seen that the convergent section of the zone 1a causes a gradual and progressive piling up of the material, enhanced by the introduction of the low pressure steam through the orifices 16 of the enclosure 15, thus obtaining sufficient compression of the textile material at the entrance to the portion 1b to offer complete steam tightness against the vapour that might proceed from successive zones, the material itself being compressed forming a hermetic stopper. Said zone 1b continues to another zone 1c but shorter, wherein the sectional area gradually increases thus lowering the compression on the material and allowing the entrance of the steam to penetrate same.

This penetration of steam is effected in the following zone of constant or uniform area 1d, said steam entering through the holes 11, and at the end of this zone 1d the material passes through another short zone 1e of convergent section with the object of once again compressing the material to form a steam-tight stopper separating zone 1f of uniform sectional area.

The three zones 1c, 1d and 1e, are contained within the steaming chamber 12, while another element 20 surrounding the perforations 21 is contained in the zone 1f, said perforations being practiced in the main tubular enclosure or conduit, to allow the penetrated vapour contained by the fibres to escape by the outlet tube 38, thus preventing damage to the material that is now forming a steam-tight stopper.

Another short zone 1g follows the zone 1f, the former gradually increasing in sectional area for the material to adopt a spongeous state in the interior of the following zone of uniform section 1h, into which zone the treatment development dynamic fluids are made to enter through the perforations 29 for the processing of the material. Another zone 1i of short length and convergent section communicates with the uniform section zone 1j immediately following the zone 1i, where a steam-tight stopper is again formed by the material to separate the previous treatment zone from the following zones. This sequence, 1g, 1h, 1i, 1j, is similar to that followed by the following zones 1k, 1m, 1n, 1p, except that the zone 1m incorporates three tubular elements that introduce the treatment fluids into the interior of the main tubular enclosure 1 where they become mixed, while the decreasing section outlet zone 1n is followed by another zone 1p to produce another stoppage by the material in order to separate the previous tubular elements from the following tubular element 23, preceded by the gradually increasing section zone 1g, communicating with the constant or uniform section zone 1r of the tubular element 23 where another treatment is imposed on to the contained textile material.

Another characteristic of this machine consists of and comprises within the main tubular enclosure or conduit 1, another zone 1s in continuation of the zone 1r, said zone 1s being of adequate length and of progressively decreasing sectional area, provided over the whole of its surface with perforations 39 in contact with the atmosphere, in order to gradually increase the density of the textile material, thereby squeezing same to drain off any excess of moisture. Then follow finally the zones 1t and 1u, the material being expanded in the former zone and discharged from the latter, or 1u.

Preferably, the conveyor element, according to the realization of same shown in FIGURE 4, consists of a series of plates 40 that are essentially flat and articulated forming a chain, said plates being provided with pins 41 disposed at right-angles to the direction of movement of the chain. The coupling between said plates 40 is effected in such a manner that the thickness of the conveyor element results practically uniform throughout its entire length and that the area of said chain be the maximum possible in order not to subject the conveyed material to different degrees of compression nor to allow the passage of said material from one side of the conveyor to the other; and finally, apertures 42 covered with transparent material are situated in the walls of said main tubular enclosure for the inspection of the state of the compression of the textile material within said tubular enclosing 1.

Any constructional details in the practical realization of this invention may be varied from those herein given as an example that do not contravene the essential characteristics of same as included within the following claims, and shall be therein included.

I claim:

1. Apparatus for the continuous treatment of filiform grouped materials by means of fluids under pressure and/or at higher than boiling point temperatures, comprising in combination a tubular enclosure, a conveying chain which moves through said enclosure and drags continuously the filiform material through said enclosure, an entrance device for feeding the material to said tubular enclosure, means in said feeding device allowing the conveying chain to enter simultaneously into said tubular enclosure, the speed of said chain being lower than that of said feeding device so that the material is gathered when it advances through said tubular enclosure, at least one perforated zone in said tubular enclosure surrounded by a casing provided with inlet and outlet means for steam under pressure or other treatment fluid, forming at least one steaming or fluid treatment chamber, said tubular enclosure comprising before said inlet and after said outlet of said steaming chamber a zone of constant section of sufficiently small area for the advancing gathered material to be compressed to such a density degree that it forms a seal against leakage of steam or fluid present in the chamber.

2. Apparatus according to claim 1, wherein said tubular enclosure comprises, between each zone of restricted section and said steaming chamber inlet and outlet respectively, a zone having a section varying progressively from the section of the restricted zone to that of the chamber.

3. Apparatus according to claim 1, wherein said tubular enclosure comprises a zone situated immediately after said feeding device whose section is of sufficient area to allow the material to be compressed to a degree lower than that causing slipping of the material in said feeding device, while assuring its perfect introduction into said tubular enclosure and conveyance by said chain.

4. Apparatus according to claim 1, wherein said tubular enclosure comprises, between said feeding device and said steaming chamber, an intermediate zone that is perforated and surrounded by a casing forming a chamber in communication with said steaming chamber through pressure regulating means forming a material pre-steaming chamber in which the structure of the material and impregnation products contained therein are prefixed.

5. Apparatus according to claim 1, wherein said perforated zone of said tubular enclosure situated within said steaming chamber has a sufficiently large section to allow the expansion of the material by consequence of its elasticity, thus facilitating the penetration of the steam into its mass and is of sufficiently small section to assure the conveyance of the material by said chain.

6. Apparatus according to claim 1, wherein the zone of restricted section of said tubular enclosure situated after said steaming chamber comprises a perforated intermediate portion, a casing surrounding said intermediate portion, said casing being provided with a drain conduit to allow the expulsion of the steam contained in the material.

7. Apparatus for the continuous treatment of filiform grouped materials by means of fluids under pressure and/or at higher than boiling point temperatures, comprising a tubular enclosure, a device for feeding the material to be treated to said enclosure, a conveying chain which moves all along said enclosure and drags the material at a speed lower than the feeding speed of the material, thus the material forming gathers within the tubular enclosure, said tubular enclosure comprising a first zone whose sectional area decreases progressively to a second zone of reduced constant section where the material is compressed to a degree which forms a seal against fluid leakage, a subsequent zone of greater section where said tubular enclosure is perforated and surrounded by a casing through flows steam under pressure to product the steaming treatment of the material, a plurality of subsequent consecutive tubular elements each comprising opposite portions with walls perforated and covered by casings each of them provided with respective inlet and outlet conduits to allow the treatment of the material advancing along the tubular enclosure by means of dynamic fluids under a pressure above the boiling point temperatures, such fluids being made to flow through the material in a perpendicular direction to the perforated portions of the tubular elements.

8. Apparatus according to claim 7, wherein the inlet and outlet conduits to and from the casings of the aforementioned tubular elements are coupled to systems adequate for producing forced circulations of the treatment fluids, said systems comprising means for reversing the direction of flow of the fluids.

9. Apparatus according to claim 7, wherein the sectional areas of said tubular elements are of a size to reduce the density of the material moving therethrough to allow the easier penetration of the treatment fluids.

10. Apparatus according to claim 7, wherein said tubular enclosure comprises, between said fluid treatment adjacent elements, a zone of sufficiently reduced sectional area for the advancing gathered material to be compressed to such a density degree that it forms stoppers between said elements thus preventing mixing of the distinct treatment fluids.

11. Apparatus according to claim 7, wherein after said fluid treatment elements said tubular enclosure comprises a final zone provided with perforations over the whole of its surface in communication with the atmosphere and of gradually decreasing sectional area in order to produce a continuous squeezing effect on the material in movement, thus removing any excess of moisture.

12. Apparatus for the continuous treatment of filiform grouped materials by means of fluids under pressure and/or at higher than boiling point temperatures, comprising in combination a tubular enclosure, a device for feeding the materials to be treated to said enclosure, and a conveying chain which moves all along said enclosure and drags the material through same, said conveying chain being composed by a series of similar and essentially flat plates linked together and provided with connecting pins at right angles to the direction of movement of the chain, the coupling between said plates being effected in such a manner that the thickness of the chain results uniform throughout its entire length, and that the area of said chain be the maximum possible, so that no differences of pressure shall be applied to the material being carried due to any variation in structural dimensions of said chain and also to prevent the material being carried from one side of the chain to the other.

References Cited

UNITED STATES PATENTS

| 3,175,375 | 3/1965 | Yazawa et al. | 68—5 |
| 3,307,381 | 3/1967 | Devylerre | 68—5 |

WILLIAM I. PRICE, Primary Examiner

U.S. Cl. X.R.

68—158